Oct. 19, 1948.   H. R. GREENLEE   2,451,730
DETENT MEANS
Original Filed May 15, 1944
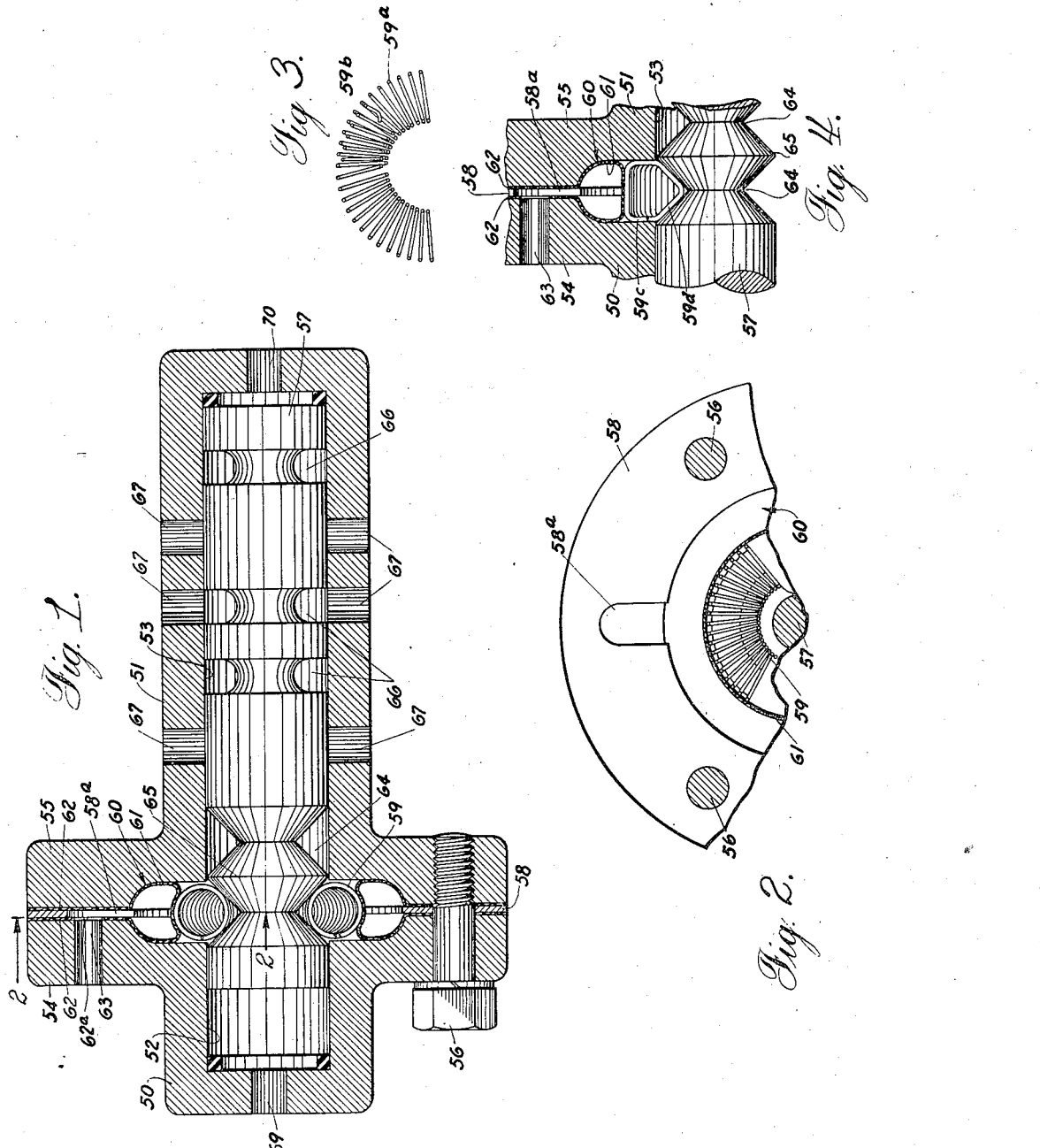
INVENTOR.
Harry R. Greenlee
BY
Brown, Jackson, Boettcher & Dienner
ATTORNEYS.

Patented Oct. 19, 1948

2,451,730

UNITED STATES PATENT OFFICE 2,451,730

DETENT MEANS

Harry R. Greenlee, Indianapolis, Ind., assignor to The Studebaker Corporation, South Bend, Ind., a corporation of Delaware Original application May 15, 1944, Serial No. 535,587. Divided and this application May 2, 1946, Serial No. 666,664

14 Claims. (Cl. 74—527)

My present invention relates to an improvement in detent means, and more particularly to detent means having use with shifting mechanisms for transmissions.

The present application is a division of my earlier application Serial No. 535,587, filed May 15, 1944.

Broadly, the present invention may be incorporated in any type of shift mechanism or the like in which it is desired to provide step by step selective positioning of a rod or other member. So far as I am aware most prior forms of detent means have usually taken the form of a spring loaded ball adapted to have resilient engagement with a grooved slide rod. In the known spring loaded ball type of detents a uniform pressure cannot be impressed on the rod since the spring is fixed in one position relative thereto and acts in but one direction with respect to the rod. This disadvantage has been sought to be overcome by arranging a plurality of spring loaded ball detents in radial spaced relation about the shaft or the rod. However, this arrangement is unsatisfactory from the standpoint of cost, and, further, does not satisfactorily solve the problem in that localized wear appears at the grooves of the shaft with which the balls are adapted to engage. This localization at the point of engagement of a ball of a detent means with the shaft causes crystallization of the ball. After continued use the point or points of engagement of the ball or balls with the shaft causes wear of the elements interfering with the proper snap positioning of a shaft or rod which is generally desirable in such organization of parts. It has further been proposed in the prior art to provide a detent means comprising an annular coiled spring adapted to have selective engagement with one of a plurality of grooves of a shift rod or member. This form of detent overcomes many of the aforementioned undesirable aspects of the ball form of detent means. However, so far as I am aware the latter forms of detents of the prior art are not capable of providing for controlling the amount of force other than the inherent spring force of the coil or garter spring to effect, for example, locking of the shift rod or member in a selected position or to require different degrees of force in shifting of the shift rod or member to different selected positions thereof.

It is an object of my invention to provide a detent means for shifting mechanism or the like which comprises an annular coil or garter spring adapted to have selective engagement with one of a plurality of substantially V-shaped grooves in a shift rod or member, and in which means is provided for selectively controlling the amount of force adapted to be transmitted through the annular coil spring to the shift rod.

A further object of my invention is to provide a detent means comprising an annular coil spring adapted to be disposed about a shift rod, and of a normal diameter to extend into a groove in the rod for substantially equal and uniform cooperation with opposite sides of the groove with the spring being mounted to permit radial expansion thereof upon axial shifting movement of the rod, and means associated with the annular coiled spring for forcing the same into seating engagement with a groove of the rod in excess of the amount of force inherent in the spring.

A further object of my invention is to provide a detent means as last aforesaid in which diaphragm means is adapted to be associated with an annular coil spring for receiving fluid under pressure for urging the annular coil spring into seating engagement with a groove of the rod to prevent shifting of the latter.

Another object of my invention is to provide a detent means comprising an annular coiled spring disposed about an axially shiftable rod and having telescopic ends for facilitating expansion and contraction of the spring in shifting of the rod.

Another object of my invention is to provide a detent means in which an annular coil spring is adapted to be disposed about an axially shiftable rod provided with an inner periphery of substantially V-shape having seating engagement in substantially correspondingly V-shaped grooves in the shift rod.

A still further object of my invention is to provide various forms of annular coiled springs in combination with various forms of flexible diaphragm means for exerting pressure through the springs in an amount in excess of the inherent force of the springs; and other forms in which the spring exerts substantially no force but serves to transmit force expended by fluid pressure in the diaphragm means.

Another object of my invention is to adapt the detent means to shift mechanism of a transmission in which the shift rod is shifted axially by fluid pressure, and to a mechanism which is operable for the selection of different gear ratios or different drives of a hydraulically actuated transmission.

The above and other objects and advantages of my invention will appear from the detail description.

Now in order to acquaint those skilled in the art with the manner of utilizing and constructing devices in accordance with my invention, I shall describe in the accompanying drawings certain preferred embodiments of my invention.

In the drawings:

Figure 1 is a vertical sectional view through one form of shift mechanism embodying a detent means constructed in accordance with my present invention with the shift rod with which the detent means is associated being shown in elevation;

Figure 2 is a detail sectional view taken substantially on line 2—2 of Figure 1 looking in the direction indicated by the arrows;

Figure 3 is a detail partial side elevational view of a modified form of spring means for the detent means of my present invention; and Figure 4 is a detail sectional view of still another form which the detent means of my present invention may take.

Referring now to Figures 1 and 2 I have shown a shift rod housing comprising a pair of housing members 50 and 51 provided with bores 52 and 53, respectively, and having annular flanges at 54 and 55 into which a plurality of bolts 56 extend securing the member together with the bores 52 and 53 disposed co-axially of and opening into each other. A shift rod or member 57 is disposed within the bores 52 and 53 for sliding movement axially of the common axis of the bores. The flanges at 54 and 55 are recessed to receive an annular coiled spring or garter spring 59, and a flexible bellows means 60. The bellows means 60 comprises a bellows portion 61 from which a pair of annular flange elements 62 extend radially, with a ring 58 disposed between the pair of annular flange elements 62. The flange elements 62 and the ring 58 as shown are adapted to be secured between the flanges 54 and 55 of the housing members 50 and 51. The flange 54 of member 50 is provided with a duct 63 the inner end of which is in registry with an opening 62a formed in the adjacent flange 62 of the bellows 60, and the ring 58 is provided with a slot 58a extending from its inner edge and communicating with the interior of bellows 60 and through opening 62a, with the duct 63. This construction provides a means for supplying fluid under pressure to the bellows for purposes to be explained later in detail.

The shift rod 57 at one end thereof is formed with a pair of substantially V-shaped grooves 64 defining therebetween a substantially V-shaped ridge 65. The shift rod 57 adjacent its other end is provided with a plurality of annular grooves 66 which are adapted to be brought into registry with one each of a plurality of diametrically disposed ducts 67 formed in member 51, with the axes of the several ducts extending substantially at right angles to the axis of the bore 53. The parts 50 and 51 are further provided with ducts 69 and 70, respectively, for admitting fluid under pressure adjacent opposite ends of the shift rod 57 to slide the same axially within the bores 52 and 53. Admission of fluid under pressure through the duct 69 of the part 50 is adapted to cause movement to the right of the shift rod 57 as viewed in Figure 1, and admission of fluid through the duct 70 of the part 51 is adapted to cause movement of the shift rod 57 to the left as viewed in this figure. Sliding movement of the rod 57 is adapted to align certain of the annular grooves 66 of the rod 57 with certain of the opposed pairs of ducts 67 of the part 51 providing for the selection of a desired gear ratio of, for example, a hydraulically actuated transmission.

When the bellows means 60 is devoid of fluid under pressure the annular coil spring 59 provides for positive positioning of the valve member 57 in aligning certain of the annular grooves 66 with the several diametrically opposed pairs of ports or ducts 67. However, upon admission of fluid under pressure through the ducts 63 of the part 50 to the bellows 60 the latter is adapted to exert pressure on the garter spring 59 to increase the force necessary to cause sliding movement of the shift rod 57 axially of the bores 52 and 53. The force expended by the flexible bellows 60 on the garter spring will be uniform since the portion 61 thereof is an annular configuration and engages the entire outer periphery of the garter spring.

Admission of fluid through the ducts 69, 70 and 63 may be suitably controlled by the appropriate valve mechanism to vary the force imposed on the shift rod 57 in different selected positions, by means of the garter spring and the flexible bellows and for causing delayed action of the shift rod in shifting from one position to another which under certain circumstances may be highly desirable as, for example, in controlling the actuation of an automotive transmission.

It will also be understood that under certain circumstances the bellows 60 may be charged with fluid under pressure sufficient in an amount to prevent shifting of the shift rod 57 by admission of fluid in either of the end ducts 69 and 70 of the housing parts 50 and 51, respectively, to provide a definite lock-up, for example, in an automotive transmission. Such lock-up would be desirable, for example, if an attempt should be made by the operator of a vehicle to shift to reverse while the automotive vehicle is moving in a forward direction.

In Figure 3 I have shown a modified form of annular coil spring 59a which may be substituted for the spring 59 of Figure 2 in the arrangement of parts as shown in the latter figure. The spring 59a has an end portion 59b thereof of different diameter than the body of the spring with the end portion 59b being shown as formed of convolutions of less diameter and of different pitch than the convolutions of the remainder of the spring. The reduced end portion 59b is thus adapted to be inserted in the other end portion of the spring 59a, as shown, in telescoping relation therewith, and the convolutions of end portion 59b due to the different pitch thereof will slide within the other end portion of the spring without catching therein or interlocking therewith. It will be seen that spring 59a may be expanded radially without being placed under tension by passage of element 65 therethrough in the shifting of the rod or plunger 57. Accordingly, the locking effect of spring 59a is controlled solely by the pressure exerted thereon by the bellows 60, which may be desirable in certain cases as giving a more positive and delicate control than can be had if a spring of considerable strength and tensioned by the movement of element 65 therethrough be used. In other respects, spring 59a functions in the same manner of spring 59 of Figure 1 and it is believed a further detail description thereof is not required for full understanding of this embodiment of my invention.

The modification shown in Figure 4 embodies a spring 59c shaped to provide an inner nose portion 59d of V-shape substantially conforming to the cross-sectional contour of the grooves 64. The spring 59c may be uniform in cross-section with its end portions interlocked, in which case it is tensioned by passage of element 65 therethrough in substantially the same manner as spring 59 of Figure 1 though it will not roll like the latter spring in shifting from one groove to the other.

Since the nose portion 59d of spring 59 extends well down into groove 64 and has relatively large area of contact with the side walls of the groove this spring exerts a materially greater locking effect than spring 59 of Figure 1. Accordingly, less pressure is required in the bellows 60 to obtain the desired locking effect when using spring 59c of Figure 4 than is required when the spring 59 of Figure 1 is used. Instead of having the end portions of spring 59c interlocked one end portion thereof may be of different diameter than the other so as to be in telescoping relation therewith. This may be accomplished by forming the convolutions at one end portion of less diameter and different pitch than those at the other end portion in substantially the same manner as explained above with respect to spring 59a of Figure 3. If the end portions of spring 59c be telescoped for relative sliding movement this spring will not be tensioned by the passage of shift member 57 therethrough, and it will then function in substantially the same manner as spring 59a of Figure 3 except that spring 59c will not have any rolling action and due to its shape will exert a greater locking effect as described above. This increased locking effect is advantageous in that it renders possible a positive and delicate control while requiring less pressure in the bellows 60 to obtain the desired locking effect than is required when using spring 59a of Figure 3.

While I have shown what I consider to be the preferred embodiments of my invention it will be understood that various changes and rearrangements may be made therein without departing from the spirit and scope of my invention.

I claim:

1. A shift mechanism comprising a housing having a bore therein and an annular recess opening into said bore, a shift rod mounted for sliding movement in the bore of said housing, said rod having an annular groove and an annular coil spring disposed about said rod and confined in the recess of said housing against movement axially of said rod, said annular coil spring being of a diameter to extend normally into a groove of said rod to prevent normally sliding movement of the latter, and diaphragm means in the recess of said housing for applying force to said annular coil spring.

2. A shifting mechanism comprising a housing having a bore therein and an annular recess opening into said bore, a shift rod mounted for sliding movement in the bore of said housing, said rod having an annular groove and an annular coil spring disposed about said rod and confined in the recess of said housing against movement axially of said rod, said annular coil spring being of a diameter to extend normally into a groove of said rod to prevent normally sliding movement of the latter, and a deformable substantially annular diaphragm means in the recess of said housing for engaging the outer periphery of said annular coil spring, said diaphragm means being adapted to receive fluid under pressure for urging said annular coil spring into engagement with said rod.

3. A shift mechanism comprising a housing having a bore therein and an annular recess opening into said bore, a shift rod mounted for sliding movement in the bore of said housing, said rod having an annular groove, and an annular coil spring disposed about said rod confined in said recess against axial movement and normally extending into one of said grooves effective to hold said rod against sliding movement, the end portions of said spring being telescoped one within the other for relative sliding movement whereby said spring may be expanded radially without being placed under appreciable tension, and means for applying inward pressure to said spring.

4. A shifting mechanism comprising, a housing having a bore therein and an annular recess opening into said bore, a shift rod mounted for sliding movement in the bore of said housing, said rod having a portion provided with a pair of spaced annular V-shaped grooves forming therebetween a substantially V-shaped ridge, and a radially expansible annular coil spring disposed about said rod confined in said recess against axial movement and having an inner V-shaped portion substantially conforming to the cross-section of said grooves and normally extending into one thereof effective to hold said rod against sliding movement.

5. A shifting mechanism comprising, a housing having a bore therein and an annular recess opening into said bore, a shift rod mounted for sliding movement in the bore of said housing, said rod having a portion provided with a pair of spaced annular V-shaped grooves forming therebetween a substantially V-shaped ridge, a radially expansible annular coil spring disposed about said rod and confined in said recess against axial movement, and means for applying inward pressure to said spring.

6. Detent means of the character described comprising a member having a plurality of annular grooves, an annular coiled spring disposed about said member and being adapted to fit selectively in said grooves, and flexible diaphragm means surrounding said spring adapted to receive fluid under pressure for forcing said spring into seating engagement in said grooves.

7. Detent means of the character described comprising, a housing, a member mounted for sliding movement in said housing and having a plurality of annular grooves, an annular coil spring supported in said housing against sliding movement with said member and being adapted to be disposed selectively in said grooves for yieldingly restraining sliding movement of said member, and means associated with said spring for forcing the same into seating engagement in said grooves in excess of the amount of force inherent in said spring.

8. Detent means of the character described comprising, a housing, a member mounted for sliding movement in said housing and having a plurality of annular grooves, an annular coil spring supported in said housing against sliding movement with said member and being adapted to be disposed selectively in said grooves for yieldingly restraining sliding movement of said member, and flexible diaphragm means surrounding said spring adapted to receive fluid under pressure for exerting force radially inwardly of said spring for seating the same in said grooves with a force in excess of the force inherent in said spring.

9. Detent means of the character described comprising, a housing, a member mounted for sliding movement in said housing and having a plurality of annular grooves, an annular coil spring supported in said housing against sliding movement with said member and arranged with its opposite ends in telescopic relation and being adapted to be disposed selectively in said grooves, and means associated with said spring for forcing the same inwardly of said grooves for seating said spring therein to restrain movement of said member.

10. Detent means of the character described comprising, a housing, a member mounted for sliding movement in said housing and having a plurality of annular grooves, an annular coil spring supported in said housing against sliding movement with said member and arranged with its opposite ends in telescopic relation and being adapted to be disposed selectively in said grooves, and flexible diaphragm means surrounding said spring adapted to receive fluid under pressure for forcing the same inwardly of said grooves in seating relation therewith to yieldingly restrain movement of said member.

11. Detent means of the character described comprising, a housing, a member mounted for sliding movement in said housing and having a substantially annular V-shaped groove, and an annular coil spring supported in said housing against sliding movement with said member and having its inner periphery of substantially V-shape for fitting into said V-shaped groove for yieldingly restraining movement of said member.

12. Detent means of the character described comprising a member having a substantially annular V-shaped groove, an annular coil spring disposed about said member and having its inner periphery of substantially V-shape for fitting into said V-shaped groove for yieldingly restraining movement of said member, and means associated with said spring for forcing the same into seating engagement in said groove with a force in excess of the amount of force inherent in said spring.

13. Detent means of the character described comprising a member having a substantially annular V-shaped groove, an annular coil spring disposed about said member and having its inner periphery of substantially V-shape for fitting into said V-shaped groove for yieldingly restraining movement of said member, and flexible diaphragm means surrounding the outer periphery of said spring adapted to receive fluid under pressure for exerting force radially inwardly of said spring for seating the same in said groove with a force in excess of the force inherent in said spring.

14. Detent means of the character described comprising, a housing, a member mounted for sliding movement in said housing and having a substantially annular V-shaped groove, an annular coil spring supported in said housing against sliding movement with said member having its inner periphery of substantially V-shape form for fitting in said groove and arranged with its opposite ends in telescopic relation, and flexible diaphragm means surrounding the outer periphery of said spring adapted to receive fluid under pressure for exerting force radially inwardly of said spring for seating the V-shape portion of the latter in said groove to yieldingly restrain movement of said member.

HARRY R. GREENLEE.

REFERENCES CITED

The following references are of record in the file of this patent:

UNITED STATES PATENTS

| Number | Name | Date |
| --- | --- | --- |
| 1,808,348 | Gatzsche | June 2, 1931 |
| 1,841,613 | Libby | Jan. 19, 1932 |
| 2,170,240 | Fitch | Aug. 22, 1939 |
| 2,222,346 | Eickstaedt | Nov. 19, 1940 |